(12) United States Patent
Cuvillier

(10) Patent No.: US 10,690,964 B2
(45) Date of Patent: Jun. 23, 2020

(54) DISPLAY DEVICE AND METHOD FOR MAKING SAME

(75) Inventor: Christophe Cuvillier, Saint Ouen l'Aumone (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 694 days.

(21) Appl. No.: 13/124,379

(22) PCT Filed: Oct. 21, 2009

(86) PCT No.: PCT/EP2009/007550
§ 371 (c)(1),
(2), (4) Date: Sep. 9, 2011

(87) PCT Pub. No.: WO2010/046102
PCT Pub. Date: Apr. 29, 2010

(65) Prior Publication Data
US 2011/0310325 A1 Dec. 22, 2011

(30) Foreign Application Priority Data
Oct. 22, 2008 (DE) .......................... 10 2008 052 639

(51) Int. Cl.
*G02F 1/13357* (2006.01)
*B60K 35/00* (2006.01)
*G02F 1/1333* (2006.01)

(52) U.S. Cl.
CPC ........ *G02F 1/133615* (2013.01); *B60K 35/00* (2013.01); *G02F 1/1333* (2013.01); *G02F 1/133308* (2013.01); *G02F 1/133603* (2013.01); *G02F 1/133608* (2013.01); *B60K 2370/25* (2019.05); *B60K 2370/33* (2019.05); *B60K 2370/331* (2019.05)

(58) Field of Classification Search
CPC ......... G02F 1/133603; G02F 1/133615; G02F 1/133308; G02F 1/133608; B60K 2370/33; B60K 2370/331; B60K 35/00
See application file for complete search history.

(56) References Cited

U.S. PATENT DOCUMENTS

| 6,070,549 | A | 6/2000 | Iuchi et al. |
| 6,198,516 | B1 | 3/2001 | Kim et al. |
| 2006/0132670 | A1* | 6/2006 | Choi et al. ...................... 349/62 |
| 2007/0081111 | A1 | 4/2007 | Chang et al. |

(Continued)

FOREIGN PATENT DOCUMENTS

| EP | 0777108 | 6/1997 |
| EP | 2028046 | 2/2009 |

(Continued)

OTHER PUBLICATIONS

International Search Report for application No. PCT/EP2009/007550 dated Apr. 1, 2010.

(Continued)

*Primary Examiner* — Jessica M Merlin
(74) *Attorney, Agent, or Firm* — Fletcher Yoder, P.C.

(57) ABSTRACT

A display device is provided, such as for motor vehicles. The device comprises a display element that is backlit via a light source. A lightguide conducts light from the source. A pre-assembled back-lighting module serves to illuminate the display element, and facilitates manufacture and assembly of the device.

17 Claims, 2 Drawing Sheets

(56) References Cited

U.S. PATENT DOCUMENTS

| | | | |
|---|---|---|---|
| 2007/0139929 A1* | 6/2007 | Yoo et al. | 362/294 |
| 2007/0146571 A1 | 6/2007 | Nakagawa et al. | |
| 2007/0263374 A1* | 11/2007 | Luettgen et al. | 362/28 |
| 2008/0055882 A1 | 3/2008 | Ueno et al. | |
| 2008/0062116 A1* | 3/2008 | Morbieu et al. | 345/102 |
| 2008/0170179 A1* | 7/2008 | Shiraishi | 349/65 |
| 2008/0170412 A1* | 7/2008 | Ohno | 362/609 |
| 2009/0128730 A1* | 5/2009 | Hsu et al. | 349/58 |
| 2009/0231513 A1* | 9/2009 | Ohta et al. | 349/65 |
| 2014/0168570 A1 | 6/2014 | Box et al. | |

FOREIGN PATENT DOCUMENTS

| | | | |
|---|---|---|---|
| JP | 2002328048 A | | 11/2002 |
| JP | 2003255342 A | | 9/2003 |
| JP | 2007250305 A | | 9/2007 |
| JP | 2007279593 A | * | 10/2007 |
| JP | 2008-084860 | | 4/2008 |
| JP | 2008-171797 | | 7/2008 |
| KR | 1020040059605 | | 6/2004 |
| KR | 20040059605 | | 7/2004 |
| WO | 2007072263 A2 | | 6/2007 |

OTHER PUBLICATIONS

International Search Report for PCT Application No. PCT/EP2012/001580 dated Jun. 19, 2012, 2 pages.
International Preliminary Report on Patentability for PCT Application No. PCT/EP2012/001580 dated Nov. 14, 2013; 6 pages.
KR Office Action for KR Application No. 10-2011-7011542 dated Aug. 27, 2015.

* cited by examiner

DISPLAY DEVICE AND METHOD FOR MAKING SAME

CROSS REFERENCE TO RELATED APPLICATIONS

This application claims priority from and the benefit of PCT Application No. PCT/EP2009/007550, filed on Oct. 21, 2009; German Patent No. DE 10 2008 052 639.8, filed on Oct. 22, 2008, both entitled "Display Device and Method for Making Same", which are herein incorporated by reference.

BACKGROUND

The present invention relates to a display device, especially for an automotive vehicle, and to a method of manufacturing such a display device.

Display devices are known, for example from the Korean patent application KR 10 2004/0059605 A. This publication describes a backlit display device.

One drawback of such a prior-art device consists in its relatively complicated, and consequently relatively expensive, assembly. Another drawback of such a prior-art device lies in its assembly time, which increases depending on the number of additional parts to be assembled.

SUMMARY

The present invention especially aims to alleviate the drawbacks of the prior art, and especially those mentioned above, but also aims to provide a display device that makes it possible to assemble such a device simply and very efficiently.

According to the invention, this aim is achieved by a display device comprising a display element, the display element being backlit using a light source and a lightguide, the display device comprising a preassembled back-lighting module.

With such a display device, comprising the back-lighting module, it is advantageously possible to assemble the display device simply and efficiently.

According to a preferred embodiment, the back-lighting module comprises a frame, the frame being made of a material comprising magnesium, and the back-lighting module comprises the light source, the light source making thermal contact with the frame. This thermal contact between the light source, on the one hand, and the frame, on the other, is preferably a direct thermal contact.

The advantage of making the frame out of a material comprising magnesium resides in the fact that it is thus possible not only to produce a very low-weight back-lighting module but also to ensure a sufficiently high thermal conductivity allowing the heat generated by the back-lighting light source to flow out of the display device. The advantage of placing the light source in direct contact with the frame, especially by way of an adhesive, is that the heat transfer between the back-lighting light source and the frame (and consequently out of the back-lighting module) is greatly improved.

A preferred improvement to the invention resides in the fact that the light source is a light-emitting diode (LED) or a plurality of LEDs, and in that the light source is connected to a flexible printed circuit.

In such an embodiment of the display device it is advantageously possible to separate, on the one hand, the function of transferring the heat generated by the light source, and on the other hand, the function of connecting the light source electrically.

According to another preferred embodiment, the back-lighting module comprises a lightguide.

In such an embodiment of the display device it is advantageously possible to position the light source (or the light source elements such as the LEDs) almost independently of the display area. For example, and for an approximately rectangular display area, it is possible to position the light source or the light-source elements along one side of the display area. Consequently, a preferred improvement to the invention resides in the fact that the light source is positioned along a lateral side of the display device and in that the lightguide guides the light emitted by the light source through the display element.

Another preferred improvement to the invention resides in the fact that the back-lighting module comprises an optical filtering means and/or a means for scattering the light.

In such an embodiment, it is advantageously possible to manufacture the back-lighting module so that it may be used in various display modules, especially those of different suppliers.

According to yet another preferred embodiment, the display element is a liquid crystal display (LCD), especially comprising thin film transistors (TFT).

Another preferred improvement to the invention resides in the fact that the display device comprises a prefabricated display module.

Thus, it is advantageously possible to make the method of fabricating the display device even simpler, even more efficient and even less expensive. Moreover, it is advantageously possible to make the manufacture of the assembly device more flexible.

The present invention also relates to a method of manufacturing a display device according to the present invention, the method of manufacture comprising the following steps:
  assembly of a back-lighting module in a first step; and
  assembly of the display device using the back-lighting module.

In such an implementation of the method of manufacture, it is advantageously possible to prefabricate the back-lighting module and make the manufacture of the display device less expensive.

Another preferred improvement to the invention resides in the fact that in a second step a display module is assembled, the assembly of the display device being carried out using the back-lighting module and the display module.

In such an implementation of the method of manufacture, it is advantageously possible to prefabricate not only the back-lighting module but also the display module and thus make the manufacture of the display device less expensive.

Other features and advantages of the invention will become clear on reading the following description of a particular nonlimiting embodiment of the invention.

DRAWINGS

The invention will be better understood by virtue of the description below, which relates to preferred embodiments, given by way of nonlimiting examples, and explained with reference to the appended schematic drawings, in which.

DETAILED DESCRIPTION

Figure 1:
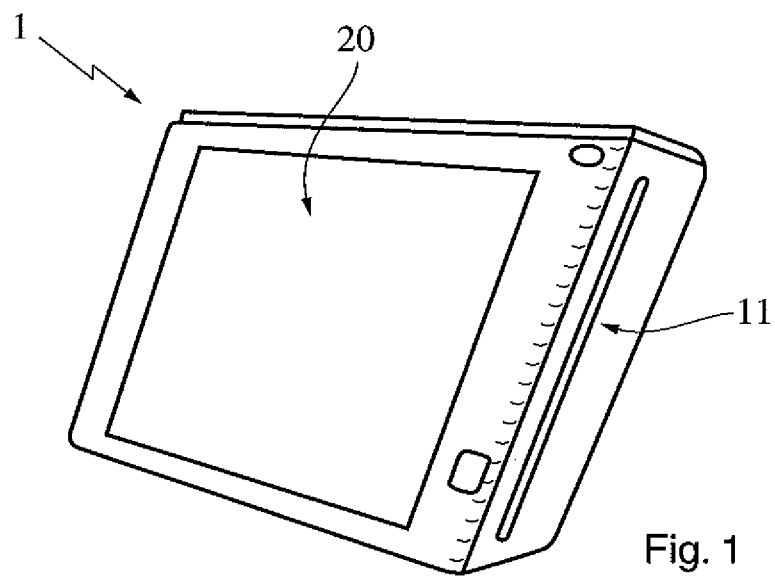
FIG. 1 is a schematic view of the display device, according to an embodiment of the present invention, comprising the back-lighting and display modules.
Figure 2:
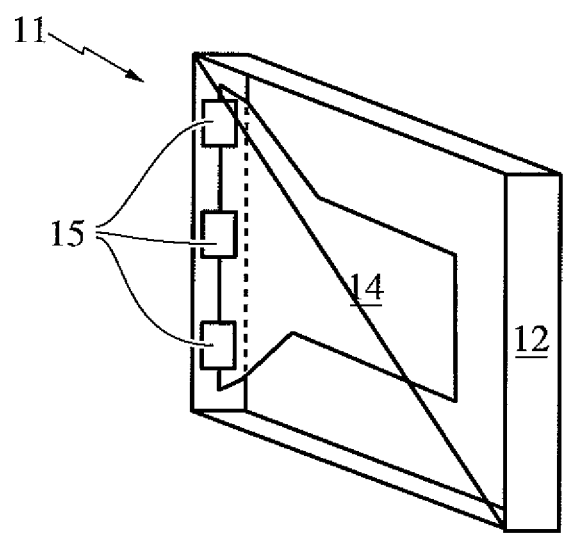
FIG. 2 is a schematic view of the back-lighting module of the display device according to an embodiment of the present invention.

FIGS. 1 and 2 of the appended drawings show the display device 1 according to the present display-device invention, especially in a vehicle (not shown).

The display device 1 comprises a display element 20, especially an LCD, and especially comprises TFTs.

The display device 1 also comprises a back-lighting module 11 which is especially preassembled. The back-lighting module 11 comprises a light source 15 and preferably a lightguide. Moreover, the back-lighting module 11 comprises a frame 12 or a jacket. The frame 12 especially serves to conduct the heat generated by the light source 15 towards the exterior. For this purpose, the light source 15 makes thermal contact with the frame 12. The frame 12 is especially made of a material having a good thermal conductivity, for example magnesium. Magnesium also has the advantage of having a relatively low specific weight, thereby making it possible to produce a relatively low-weight frame 12. The light source 15 is especially an LED or a plurality of LEDs. In the context of the present invention, a plurality of LEDs are also called light source elements.

The light source 15 is especially positioned on a lateral side of the display area, which may be rectangular. The object of the lightguide is especially to distribute light, emitted by the light source 15, as uniformly as possible over the display area. According to the present invention, the light source 15 or the light source elements 15 are connected by way of a flexible printed circuit 14.

Figure 3:
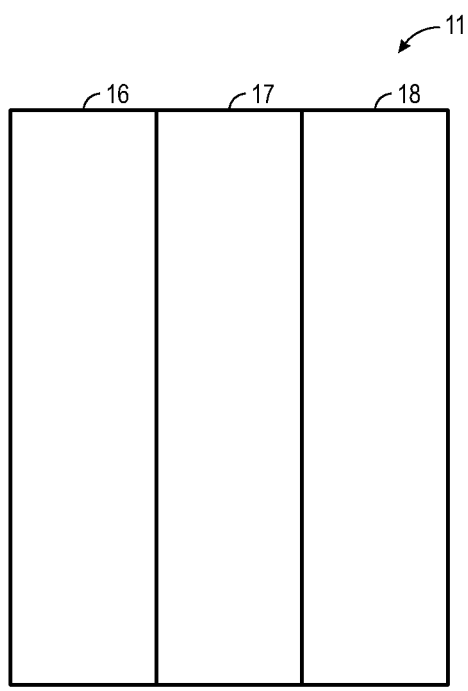
FIG. 3 is a schematic view of a portion of an embodiment of a back-lighting module.

FIG. 3 is a schematic view of a portion of an embodiment of a back-lighting module 11. FIG. 3 shows the elements of the back-lighting module 11, but does not represent the relative positions of the elements. In the illustrated embodiment, the back-lighting module 11 includes, in addition to a lightguide 16, an optical filtering means 17 and a means for scattering the light 18, so as to produce a uniform back-lighting.

According to the present invention, the back-lighting module 11 is preassembled, thereby making the method of manufacturing the assembly device easier to carry out and more efficient. According to a preferred embodiment of the present invention, the display element 20 is also preassembled (with other elements) so as to form a display module. The display device 1 may then be manufactured in an even more efficient manner by associating the back-lighting modules, on the one hand, and the display, on the other.

List of Reference Symbols
1 display device
11 back-lighting module
12 frame
14 flexible printed circuit
15 light source(s)

The invention claimed is:

1. A display device comprising a display element, the display element being backlit by a preassembled back-lighting module, wherein the preassembled back-lighting module comprises:
a frame formed from a material comprising magnesium;
a light source positioned on a lateral side of a display area of the display element, wherein the light source is in direct contact and direct thermal contact with the frame;
a lightguide configured to distribute light emitted by the light source substantially uniformly over the display area;
an optical filtering device configured to enable the preassembled back-lighting module to be used with various display element types; and
a light scattering device configured to enhance uniformity of the light distributed over the display area;
wherein the display device is formed by associating the preassembled back-lighting module with the display element; and
wherein the light source comprises a light-emitting diode (LED), and the LED is directly coupled to the frame by an adhesive.

2. The display device as claimed in claim 1, wherein the display element comprises a liquid crystal display (LCD).

3. The display device as claimed in claim 1, wherein the display device comprises a prefabricated display module.

4. The display device as claimed in claim 2, wherein the display element comprises thin film transistors (TFT).

5. The display device as claimed in claim 1, wherein the LED is connected to a flexible printed circuit.

6. A method of manufacturing a display device having a display element, comprising:
preassembling a back-lighting module in a first step; and
associating the preassembled back-lighting module with the display element in a second step;
wherein the preassembled back-lighting module comprises:
a frame formed from a material comprising magnesium;
a light source positioned on a lateral side of a display area of the display element, wherein the light source is in direct contact and direct thermal contact with the frame;
a light guide configured to distribute light emitted by the light source substantially uniformly over the display area;
an optical filtering device configured to enable the preassembled back-lighting module to be used with various display element types; and
a light scatting device configured to enhance uniformity of the light distributed over the display area;
wherein the light source comprises a light-emitting diode (LED), and the LED is directly coupled to the frame by an adhesive.

7. The method of claim 6, wherein a display module of the display device is prefabricated.

8. The method of claim 6, wherein the display element comprises a liquid crystal display (LCD).

9. The method of claim 6, wherein the display element comprises thin film transistors (TFT).

10. The method of claim 6, wherein the LED is connected to a flexible printed circuit.

11. A display device comprising a display element, the display element being backlit by a preassembled back-lighting module, wherein the preassembled back-lighting module comprises:
a frame formed from a material comprising magnesium;
a light source positioned on a lateral side of a display area of the display element, wherein the light source is in direct contact and direct thermal contact with the frame; and a lightguide configured to distribute light emitted by the light source substantially uniformly over the display area;

wherein the display device is formed by associating the preassembled back-lighting module with the display element; and wherein the light source comprises a light-emitting diode (LED), and the LED is directly coupled to the frame by an adhesive.

12. The display device as claimed in claim 11, wherein the display element comprises a liquid crystal display (LCD).

13. The display device as claimed in claim 12, wherein the display element comprises thin film transistors (TFT).

14. The display device as claimed in claim 11, wherein the display device comprises a prefabricated display module.

15. The display device as claimed in claim 11, wherein the LED is connected to a flexible printed circuit.

16. The display device as claimed in claim 11, comprising an optical filtering device configured to enable the preassembled back-lighting module to be used with various display element types.

17. The display device as claimed in claim 11, comprising a light scattering device configured to enhance uniformity of the light distributed over the display area.

* * * * *